(12) United States Patent
Ogasawara (10) Patent No.: US 7,373,641 B2
(45) Date of Patent: May 13, 2008

(54) METHOD, COMPUTER UNIT AND PROGRAM FOR CONVERTING A PROGRAM

(75) Inventor: Takeshi Ogasawara, Hachioji (JP)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 10/325,765

(22) Filed: Dec. 19, 2002

(65) Prior Publication Data

US 2003/0149969 A1 Aug. 7, 2003

(30) Foreign Application Priority Data

Dec. 20, 2001 (JP) ............... 2001-387263

(51) Int. Cl.
*G06F 9/45* (2006.01)
(52) U.S. Cl. ..................................... 717/151
(58) Field of Classification Search ............... 717/151, 717/148
See application file for complete search history.

(56) References Cited

U.S. PATENT DOCUMENTS 5,857,105 A * 1/1999 Ayers et al. ................ 717/144

FOREIGN PATENT DOCUMENTS

| JP | PUPA 06-089187 | 3/1994 |
| JP | PUPA 06-202875 | 7/1994 |
| JP | PUPA 2000-207226 | 7/2000 |

OTHER PUBLICATIONS

"Vortex: an optimizing compiler for object-oriented languages" Jeffrey Dean et al., Oct. 1996, ACM SIGPLAN Notices , Proceedings of the 11th ACM SIGPLAN conference on Oject-oriented programming, systems, languages, and applications, vol. 31, Issue 1.*
"Soot—a Java bytecode optimization framework", Raja Vallée-Rai, Phong Co, Etienne Gagnon, Laurie Hendren, Patrick Lam, Vijay Sundaresan, Nov. 1999, Proceedings of the 1999 conference of the Centre for Advanced Studies on Collaborative research.*
"Escape analysis for object-oriented languages: application to Java Bruno Blanchet",Oct. 1999 ACM SIGPLAN Notices , Proceedings of the 14th ACM SIGPLAN conference on Object-oriented programming, systems, languages, and applications, vol. 34 Issue.*
"Design, Implementation and Evaluation of Optimizations in a Java Just-InTime Compiler" IEICE Technical Report CPSY99 62-72, vol. 99 No. 252 p. 17-24.

* cited by examiner

*Primary Examiner*—Wei Zhen
*Assistant Examiner*—Philip Wang
(74) *Attorney, Agent, or Firm*—Louis P. Herzberg (57) ABSTRACT

Performs a code elimination by DCE (dead code elimination) more effectively in optimizing a program by compiling. In an example embodiment, a method invocation to be a processing target is determined based on a state of a use of an object reference in a method invocation in an execution program. The method invocation, which has been determined to be a processing target, is inline-expanded. The instance variable of an object in the inline-expanded method invocation is scalarized, and dead code elimination is performed for the execution program, to which an inline-expansion and a scalarization is performed.

15 Claims, 7 Drawing Sheets

METHOD, COMPUTER UNIT AND PROGRAM FOR CONVERTING A PROGRAM

PRIORITY

This application claims priority to Japan Patent Office application number: JP2001-387263, having a priority date of Dec. 20, 2001.

FIELD OF THE INVENTION

The present invention relates to an optimizing method of a computer program and, more particularly, to a method for performing optimization by eliminating a calculation of which result is not used (calculation of no use).

BACKGROUND ART

At present, complex software is designed with a separate component for each function. In this case, each component is designed to provide a common function to be used for various programs.

When such software is written in an object-oriented language as typified by JAVA, a high-level, object-oriented programming language developed by Sun Microsystems, each function is classified into class, object, and method to be provided. When a function is desired to be used, a program generates an object to invoke a method.

When such object-oriented software is designed, not all the calculation may be needed. For example, an object including two pieces of information is used for giving and receiving values, when only one piece of the information may actually be used, depending on where the program is located. In such a case, calculation for the information of no use would be performed in vain; the existence of such a useless performance may sometimes affect the performance of software significantly.

An approach called dead code elimination (DCE) (also called "dead store elimination") is well-known as an optimization technology for a program with a compiler. This is an optimization technology to eliminate a code, of which a calculation result is determined not to be used, by analyzing a method and the like within a compiling target. The codes include an unreachable code on a control flow, resolved conditionals, and a code defining a value not to be used (dead store). As a specific approach, backward dataflow optimization that analyses a reaching use of a definition value is performed in combination with forward dataflow optimization such as constant propagation and copy propagation on CFG (Control Flow Graph) or SSA form (Static Single Assignment Form).

However, while the above-described program optimization technology with DCE is effective in that it eliminates a waste of a complex equation such as mathematical calculation, it is defective in that it is not easy to function with an object-oriented language, which is divided into components, such as JAVA, a high-level, object-oriented programming language developed by Sun Microsystems. The primary two reasons for that will be shown as follows:

One of the reasons is that a target of DCE elimination is limited to a code within a method. Generally, for an object-oriented language such as JAVA, a high-level, object-oriented programming language developed by Sun Microsystems, a plurality of multilevel method invocations are performed to generate a piece of information. When such a multilevel method invocation is performed, it is not subject to the DCE elimination.

The other reason is that a value written on a heap can be globally referenced, and DCE cannot analyze a reaching use for such a global value. Generally, an object of JAVA, a high-level, object-oriented programming language developed by Sun Microsystems, is generated on a heap. As such, DCE cannot analyze a reaching use and a code cannot be eliminated.

Figure 7:
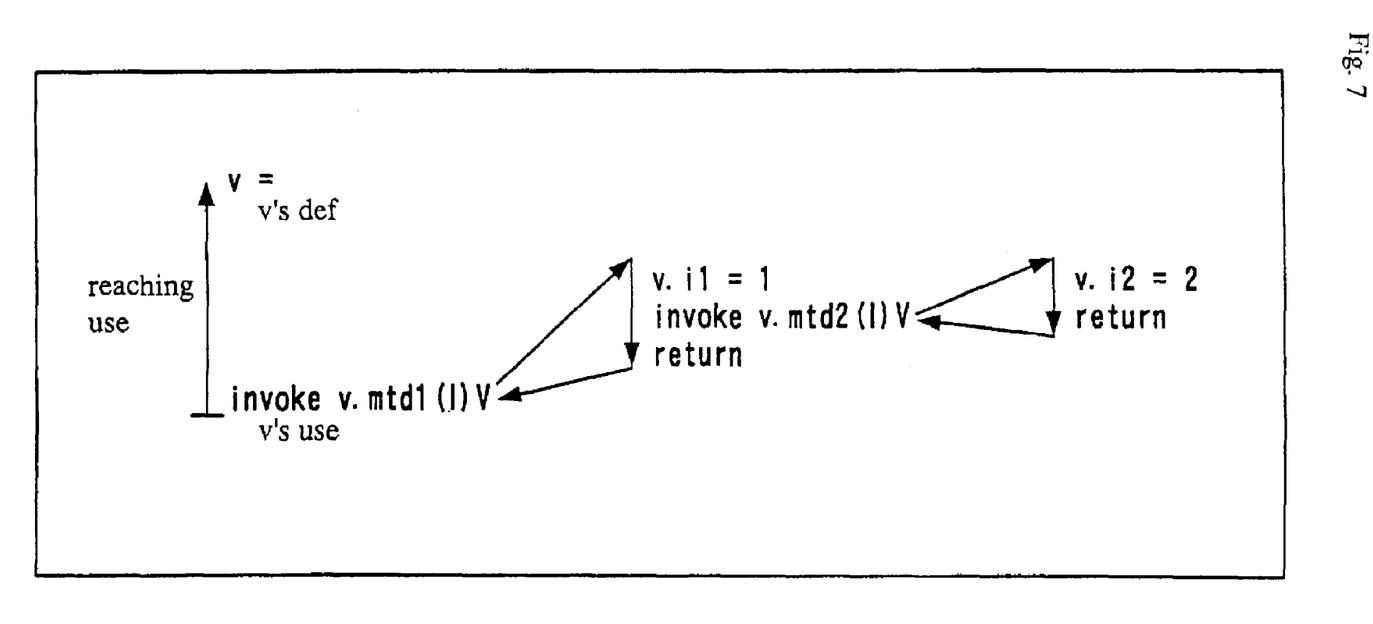
FIG. 7 is a diagram showing an example of a method invocation of a program in an object-oriented language.

FIG. 7 is a diagram showing an example of a method invocation of a program with an object-oriented language.

A part of a program shown in FIG. 7 represents the case in which an object reference v is defined (v's def), and its use is an invocation of a method mtd1 for making an object v its receiver. In this example, a method mtd1 invokes a method mtd2 by substituting a value of 1 into an instance variable i1 of an object v, then a method mtd2 substitutes a value of 2 into an instance variable i2 of an object v.

In this case, even if a substituted result of a value into an instance variable of an object v is not used in the other places, this result is not eliminated by DCE because the object v is used for invoking a method mtd1.

Both substituted results of values into instance variables i1 and i2 of object v shown in FIG. 7 are not used. In other words, both of them are dead store and this substitution is useless.

However, even if an object is not actually used, the above-described calculation of no use cannot be eliminated only by a single optimization with DCE, because the calculation appears to be used for a method invocation and the writing into the object is treated globally.

SUMMARY OF THE INVENTION

Thus, the present invention provides a definition of an object reference, which doesn't have a reaching use if it ignores a method invocation. The invention provides an optimization method for eliminating calculation that manipulates the above-mentioned object.

To achieve the above-described purposes, the present invention is provided as a program conversion method. In an example embodiment it is configured as follows: The program conversion method is a method which reads in a source code of an execution program written in an object-oriented programming language and converts it into a machine language code, characterized by comprising a step of reading out an execution program to be processed from a memory and examining whether a use of an object reference during this method invocation is an argument of which an element of the object is not used for a method invocation in the execution program, including a step of eliminating a predetermined code in a method invocation by dead code elimination, if this method invocation does not globalize the object reference during a method invocation and if a use of each object reference during a method invocation is an argument in which an element of the object is not used for a predetermined method invocation in the execution program, and a step of storing an execution program, of which a code has been eliminated, into a memory.

More preferably, this program conversion method further comprises a step of inline-expanding a method invocation and a step of scalarizing an instance variable of an object in the method invocation prior to the step of eliminating a code of the method invocation with dead code elimination.

Moreover, another program conversion method according to the present invention is characterized by further comprising a first step of reading out an execution program to be processed from a memory and inline-expanding a predetermined method invocation in this execution program, a second step of scalarizing an instance variable of an object in the inline-expanded method invocation, a third step of executing dead code elimination for the execution program which has been subject to the first and the second steps, and a fourth step of storing the execution program, which has been subject to dead code elimination, into a memory.

More preferably, this program conversion method further comprises a step of determining a method invocation as an inline-expansion target, if a use of an object reference in the method invocation is an argument of which an element of the object is not used for a method invocation in an execution program, and if a predetermined method invocation in an execution program does not globalize an object reference during a method invocation.

The present invention achieving the above-described purposes is also provided as a computer configured as follows: A computer that reads in a source code of an execution program written in an object-oriented programming language and converts it into a machine language code, characterized by comprising a processing target extraction unit that determines a method invocation to be processed based on a state of object reference during a method invocation, an inline-expansion unit that inline-expands the method invocation, which has been determined as a processing target by the processing target extraction unit, a scalarization unit that scalarizes an instance variable of an object during the method invocation, which has been inline-expanded in this inline-expansion unit, and a dead code elimination execution unit that executes dead code elimination for the execution program, which has been subject to processes by an inline-expansion unit and a scalarization unit.

Specifically, the processing target extraction unit determines a method invocation as a processing target, if the method invocation does not globalize an object reference during the method invocation and if a use of each object reference during a method invocation is an argument of which an element of the object is not used for a predetermined method invocation in the execution program.

Whether a predetermined method in a program matches the above-described condition or not may be examined in the following two ways: By providing a code analysis unit and by performing analysis during a program conversion, or by having analyzed each method of an execution program and by storing the result of analysis into a database for necessary information to be read out therefrom later when a program conversion is performed. The method that would be match the above-described condition may have been artificially defined and have been stored in a database, which may be referenced when a program conversion is performed.

The above-described computer may be configured to further comprise a program execution unit that executes an execution program, which has been translated into a machine language code.

The present invention may also be provided as a program that provides the above-described program conversion methods and various functions by controlling a computer. This program may be provided by distributing on a magnetic disc, an optical disc, a semiconductor memory or other storage medium that stores the program thereon or by delivering over a network.

DESCRIPTION OF SYMBOLS

100 . . . compiler
110 . . . processing target extraction unit
120 . . . phantom use analysis unit
130 . . . inline-expansion unit
140 . . . scalarization unit
150 . . . DCE (dead code elimination) execution unit
200 . . . program execution unit
300 . . . memory
310 . . . phantom use database
400 . . . code generation device
500 . . . storage device
600 . . . network

DESCRIPTION OF THE INVENTION

The present invention will be now described in detail according to the embodiments illustrated in the attached drawings. First, the summary of the present invention will be described. If a use of an object reference is an argument of a method invocation with an element of the object being not used, and if the object reference does not globalize (escapes) in the method invocation, that use will be called a "phantom use".

In the present invention, if a use of an object defined by a certain code is analyzed only to be a phantom use, a method invocation of the phantom use is inline-expanded. Next, each instance variable of the object is scalarized. Then, DCE (dead code elimination) is performed. As a result, only the calculation of no use is eliminated, leaving the remaining calculation, which globally has an effect on the other calculation, or of which results are used.

Figure 1:
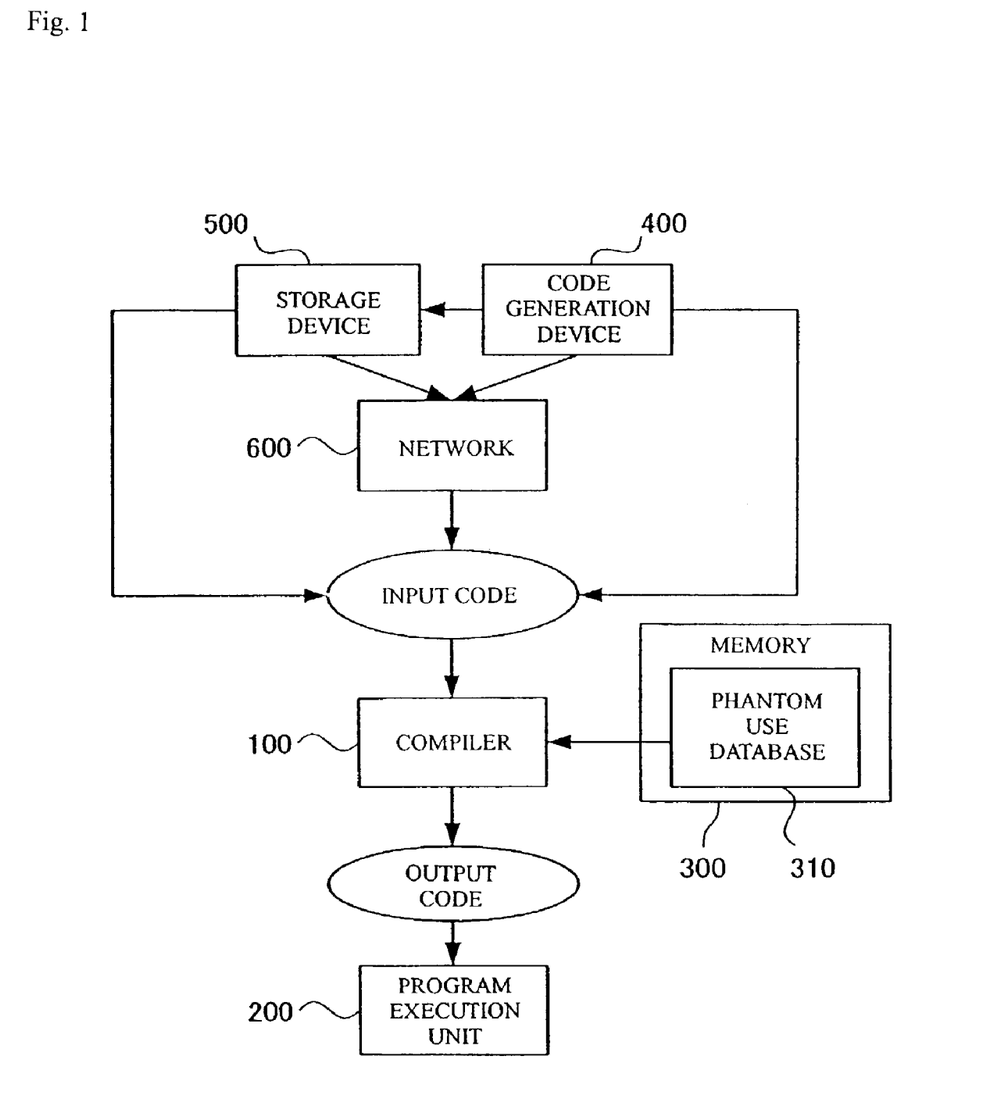
FIG. 1 is a diagram showing a system configuration of a computer system, which provides an optimization method according to an embodiment of this invention.

FIG. 1 is a diagram showing a system configuration of a computer system, which provides an optimization method according to the embodiment. Referring to FIG. 1, a computer system according to the embodiment includes a compiler 100 that compiles a source program (an input code), a program execution unit 200 that performs various processing by executing an object program (an output code) that is compiled at a compiler 100, and a memory 300. A compiler 100 and a program execution unit 200 are provided in a program-controlled CPU in a computer system of a personal computer or of a workstation. A memory 300 is a main memory of a computer, being provided in the form of RAM and the like. A phantom use database 310 that is used in the embodiments is stored in a memory 300. Although not shown in FIG. 1, a program for controlling a CPU to operate it as a compiler 100 or an object program for compiling is also stored. It is needless to say that a phantom use database 310 and a program stored in a memory 300 are also stored properly in other media such as magnetic disc and the like, if desired.

In FIG. 1, a compiler 100 inputs and processes an input code written in a byte code and generates and outputs an output code written in a machine language. Inputting of this input code is performed by directly inputting the input code generated at a code generation device 400, by inputting from a storage device 500 that stores the input code, which has been generated at a code generation device 400, or by inputting via a network 600 from a code generation device 400 or a storage device 500 that exists on the network 600. The output code that has been generated by a compiler 100 is executed at a program execution unit 200.

In the example embodiment, a compiler 100 can be such a compiler as a JIT (Just In Time) compiler in JAVA, a high-level, object-oriented programming language developed by Sun Microsystems, that dynamically compiles an execution program on executing the execution program, or as a compiler that an object program, which is generated by having compiled a source code, as an execution program.

Figure 2:
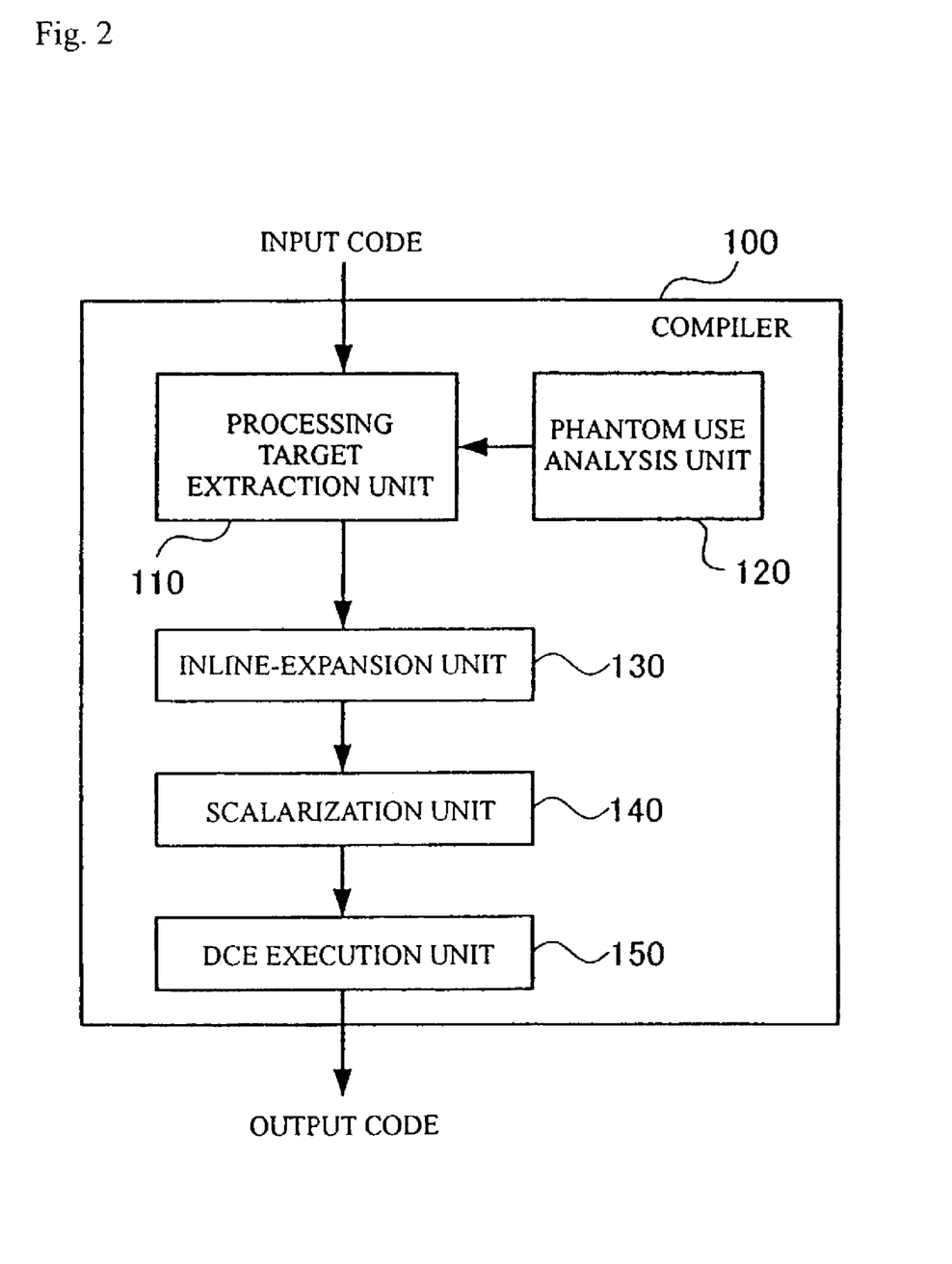
FIG. 2 is a diagram illustrating a compiler configuration of the embodiment.

FIG. 2 is a drawing illustrating a configuration of a compiler 100 according to the embodiment. Referring to FIG. 2, a compiler 100 comprises a processing target extraction unit 110 that extracts a method invocation, which becomes an optimization target of the embodiment; a phantom use analysis unit 120 that performs a phantom use analysis to analyze information on a phantom use, which is used in the processing target extraction unit 110; an inline-expansion unit 130 that inline-expands a method invocation; a scalarization unit 140 that scalarizes an object structure; and a DCE execution unit 150 that performs dead code elimination (DCE).

Each component of a compiler 100 shown in FIG. 2 is a virtual software block that is provided in a CPU controlled by a computer program. The computer program that controls a CPU is provided by distributing a storage device such as a CD-ROM or a floppy disc that stores the computer program thereon, or by transmitting over a network.

Components of a compiler 100 shown in FIG. 2 are meant for characteristic functions according to the embodiment. Although not shown in FIG. 2, it is needless to say that a compiler 100 actually includes general functions for compiling such as a lexical analysis or a syntax analysis of an input code, code generation of a machine language, and various optimizations.

In the above-described configuration, a processing target extraction unit 110 reads in a program of a compiling target from a memory 300 and extracts a method invocation that finally becomes an optimizing target by DCE in the embodiment from the program. Specifically, the method invocation is an optimization target, if a use of an object is determined only to be a phantom use by identifying a use of an object using a dataflow analysis and by examining using an Escape Analysis whether a method invocation globalizes an object. Then information about the method invocation that is determined to be an optimization target is passed onto an inline-expansion unit 130. A program to be read in a processing target extraction unit 110 is a program that has been converted into an object code (an executable code) and has been subject to a necessary optimization.

When a method invocation is performed by referring to the definition for an object structure definition, the embodiment focuses on a case in that a method invocation does not globalize (escapes) the object and only defines an element of the object structure, i.e., a case in that an object reference in the method invocation is only phantom used. Whether the method globalizes or not can be identified by using an escape analysis. If an escape analysis analyses a use of the element only to be a phantom use for each element of an object structure that has not globalized and has been defined at a certain point of a program, a method invocation of the phantom use is an optimization target by the embodiment.

Now, a phantom use will be described further in detail. First, on passing an argument p (element vector) onto a invocation (call site) cs of a predetermined method m, a use set us for the argument p of the method m (m, p) is defined as shown in the following equation 1.

[Equation 1]

$$us(m,p)=L_d(m,p)?E_d(m,p)(\text{logical AND for each member } p_i^d)$$

$$L_{d(m,p)}=(p_1^d, \ldots, p_i^d, \ldots, p_n^d)$$

$p_i^d=1$(the case that a use of the ith element of p is absent in a method m)

$p_i^d=0$(the other cases)

$$E_d(m,p)=?_{m'\in Callee(m)} us(m',p)(\text{logical AND for each memberp}_i^d)$$

Calle(m)(a set of methods invoked by method m)

A reaching use set rus for an argument p of call site cs of a method M (M, cs, p) is defined as shown in the following equation 2.

[Equation 2]

$$rus(M,cs,p)=(p_1^u, \ldots, p_i^u, \ldots, p_n^u)$$

$p_i^u=1$(the case that a program point cs does not reach a use of the ith element of p in method M, or that all the reached uses satisfy phantom($p_i$, use)=1)

$p_i^u=0$(the other cases)

A phantom use is defined as follows based on a use set us (m, p) and a reaching use set rus (M, cs, p), which are defined in the above-described manner.

Assuming a set of call sites included in a predetermined method M being CS(M) and, for a predetermined element cs thereof, $p_i^d$ of ds(t(cs),p)=1 and $p_i^u$ of rus(M, cs, p)=1 for an argument p to be passed onto the element cs, the ith element of an argument p is called a phantom use of cs. Here, t(cs) is a method, which is invoked by a call site cs, or all the candidate methods.

A phantom function of phantom($p_i$, f) returns a value of 1 when the ith element of an argument p at a program point f is a phantom use, and returns a value of 0 in other cases. The processing target extraction unit 110 examines a value that is returned by the phantom function of phantom($p_i$, f), for each point f of a reaching use on a definition of each object structure designated as an argument p of a method M, which is a compiling target (hereinafter also referred to as an object structure p)).

Accordingly, in a method M, if a definition of an object structure p does not globalize, and all of its use is a phantom use, the method M is a processing target of future inline-expansion, scalarization and DCE.

A phantom use analysis unit 120 is an analyzing means for examining whether the ith element of an argument p at the above-described program point f is a phantom use or not, that returns a value 1 or 0 from a phantom function of phantom($p_i$, f). The value of 1 or 0 obtained from this analysis is used in the above-described process performed by a processing target extraction unit 110.

The analysis performed by a phantom use analysis unit 120 may be performed along with the above-described operation by a processing target extraction unit 110 at the time of compiling, or may be performed only a code analysis as a different process from compiling. Then an obtained result of analysis is stored in a phantom use database 310 of a memory 300 and read out by a processing target extraction unit 110 at the time of compiling to be used.

A value of a phantom function can be provided by defining in advance at the time of generating a program instead of being obtained by a code analysis. In this case, a value of a phantom function, which is defined by a programmer and the like, is stored in a phantom use database 310 of a memory 300 to be used. Accordingly, a phantom use analysis unit 120 is no longer a necessary component in such an embodiment.

In this case, compile resources can be saved by selecting a method, of which elimination is effective, for a target of an inline expansion, and by being subject to optimization, according to the information obtained before executing a program with a static analysis for the effect of eliminating a method invocation or with a stored execution history for the profile information acquired while executing a program.

An inline-expansion unit 130 inputs from a memory 300 and inline-expands the method, which has been an optimization target in a processing target extraction unit 110, i.e., in which an object structure p is not globalized and all of its use is a phantom use. The inline-expanded code is passed onto a scalarization unit 140.

A scalarization unit 140 scalarizes an object definition in the inline-expanded code that an inline-expansion unit 130 produced. A code, of which an object definition is scalarized, is passed onto a DCE execution unit 150.

A DCE execution unit 150 eliminates useless code from a method that is inline-expanded and scalarized with DCE. A code that is optimized with DCE is stored in a memory 300 as an object program, which is a result from a compiler 100.

Figure 3:
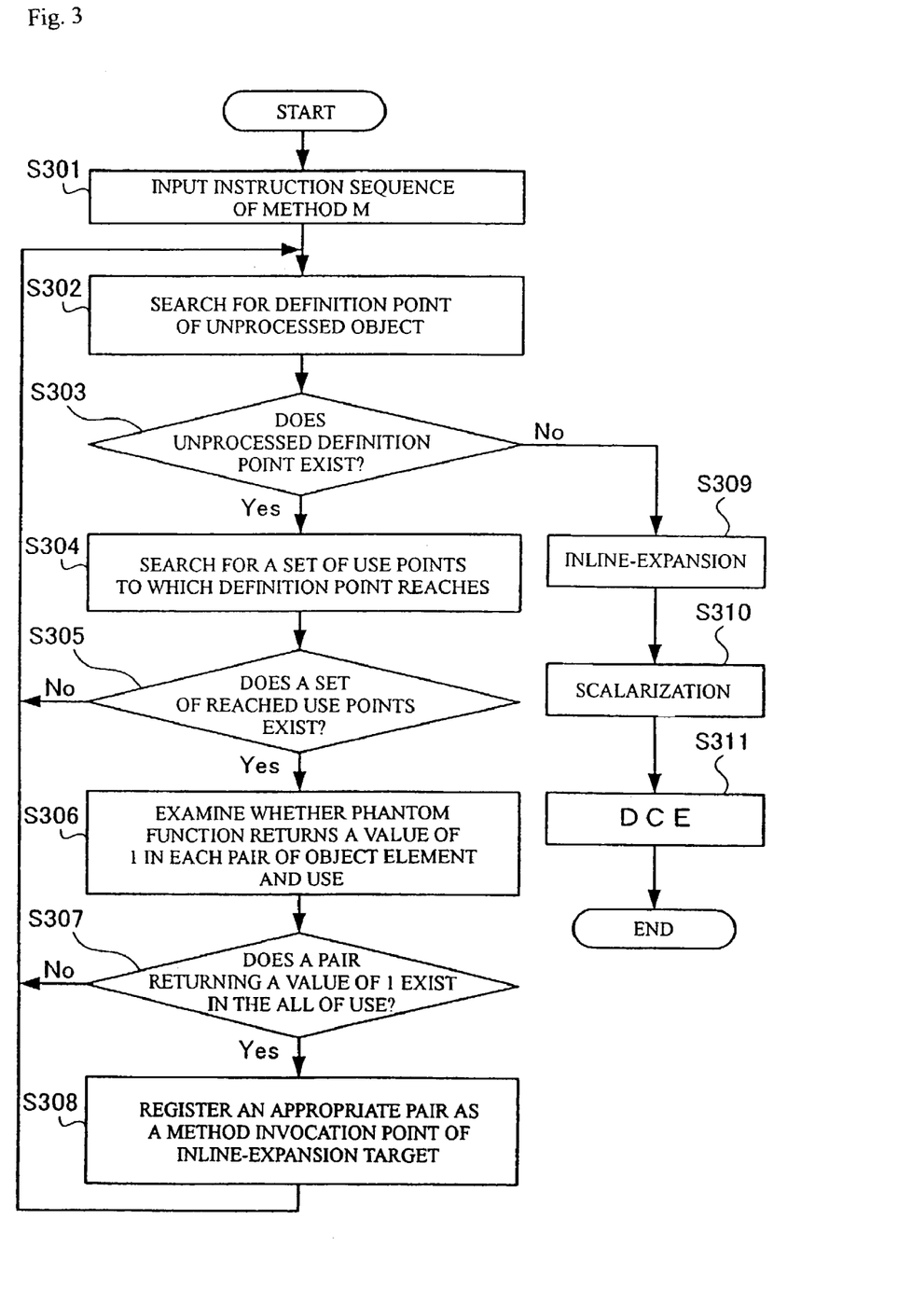
FIG. 3 is a flowchart illustrating a flow of an optimization by a compiler according to the embodiment.
Figure 4:
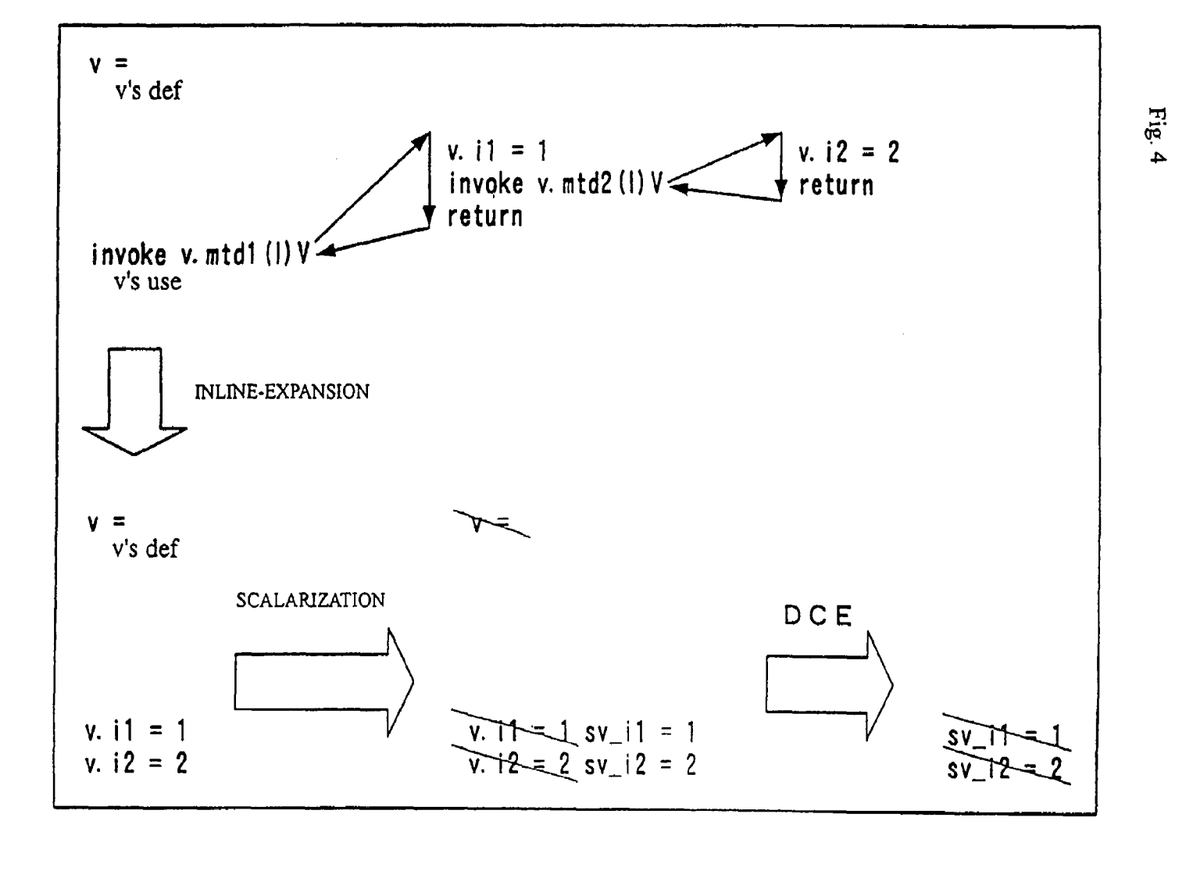
FIG. 4 is a diagram showing an optimization according to the embodiment performed for a predetermined method invocation of a program in an object-oriented language.

FIG. 3 is a flow chart illustrating a flow of optimization by a compiler 100 of the embodiment in an above-described configuration. FIG. 4 is a diagram illustrating an optimization of an embodiment according to the embodiment performed for predetermined method invocations of a program written in an object-oriented language.

In a program portion shown in FIG. 4, an object reference v is defined (v's def), of which a use is an invocation of a method mtd1 (v's use) making an object v a receiver. The method mtd1 invokes a method mtd2 after substituting a value of 1 for an instance variable i1 of an object v, and the method mtd2 substitutes a value of 2 for an instance variable i2 of an object v. Accordingly, even if the substituted value of an instance variable of an object v is not used in other parts, the result is not eliminated by the conventional simple DCE, because the object v is used for invoking a method mtd1. In the description below, an object v is assumed not to be used in the parts other than those shown in FIG. 4.

Referring to FIG. 3, according to the present invention, a processing target extraction unit 110 begins by inputting an instruction sequence of a method M that is shown in FIG. 4 (Step 301). Then, the unit searches the input instruction sequence for a definition point of an unprocessed object (Step 302). If a definition point of an unprocessed object exists, the unit searches the instruction sequence for a set of use points, to which the definition point reaches (Steps 303 and 304). If such a set of use points does not exist, the process returns to Step 302 by determining the definition points being unprocessed and searches for definition points of other unprocessed objects (Step 305).

If a set of use points, to which the definition point reaches, does exist, a processing targets extraction unit 110 examines whether a phantom function returns a value of 1 or not for each pair of a use point and an object element, to which the use point references, within the set of uses by using a phantom use analysis unit 120 (Steps 305 and 306). If such a condition of "a phantom function returns a value of 1 at all of the use points in the object element" is satisfied for at least one pair of a use point and an object element, the pair of a use point and an object element that satisfies the above-described condition is registered in a predetermined region of a memory 300 as a method invocation point, which is an object of an inline-expansion (Steps 307 and 308). Then the process returns to Step 302 and searches for definition points of the other unprocessed objects.

If no pair of a use point and an object element satisfies the above-described condition, the process returns to Step 302 assuming the definition point has been processed, and then searches for definition points of the other unprocessed objects (Step 307).

If all the definition points are determined to have proceeded to Step 303, the process is passed from a processing target extraction unit 110 to an inline-expansion unit 130 at Step 302.

An inline-expansion unit 130 inline-expands a method, which is invoked by using an object of registered object elements, based on the registered contents that is stored in a memory 300 at Step 308 (Step 309). A multilevel method invocation is converted into a code in a method by this inline-expansion, as shown in FIG. 4.

Next, a scalarization unit 140 scalarizes an object definition of registered object elements based on the registered contents that is stored in a memory 300 at Step 308 (Step 310). The object definition is localized by this scalarization, as shown in FIG. 4.

Finally, a DCE execution unit 150 performs code-elimination by DCE for a program that includes a method M, which has been a processing target (Step 311). A code for an object v, which cannot be eliminated by a simple DCE, is eliminated because the code is inline-expanded and scalarized by processing through Step 310, as shown in FIG. 4.

Next, a specific example of optimization of an object will be shown.

A typical definition of an object reference is object generation by "new".

Figure 5:
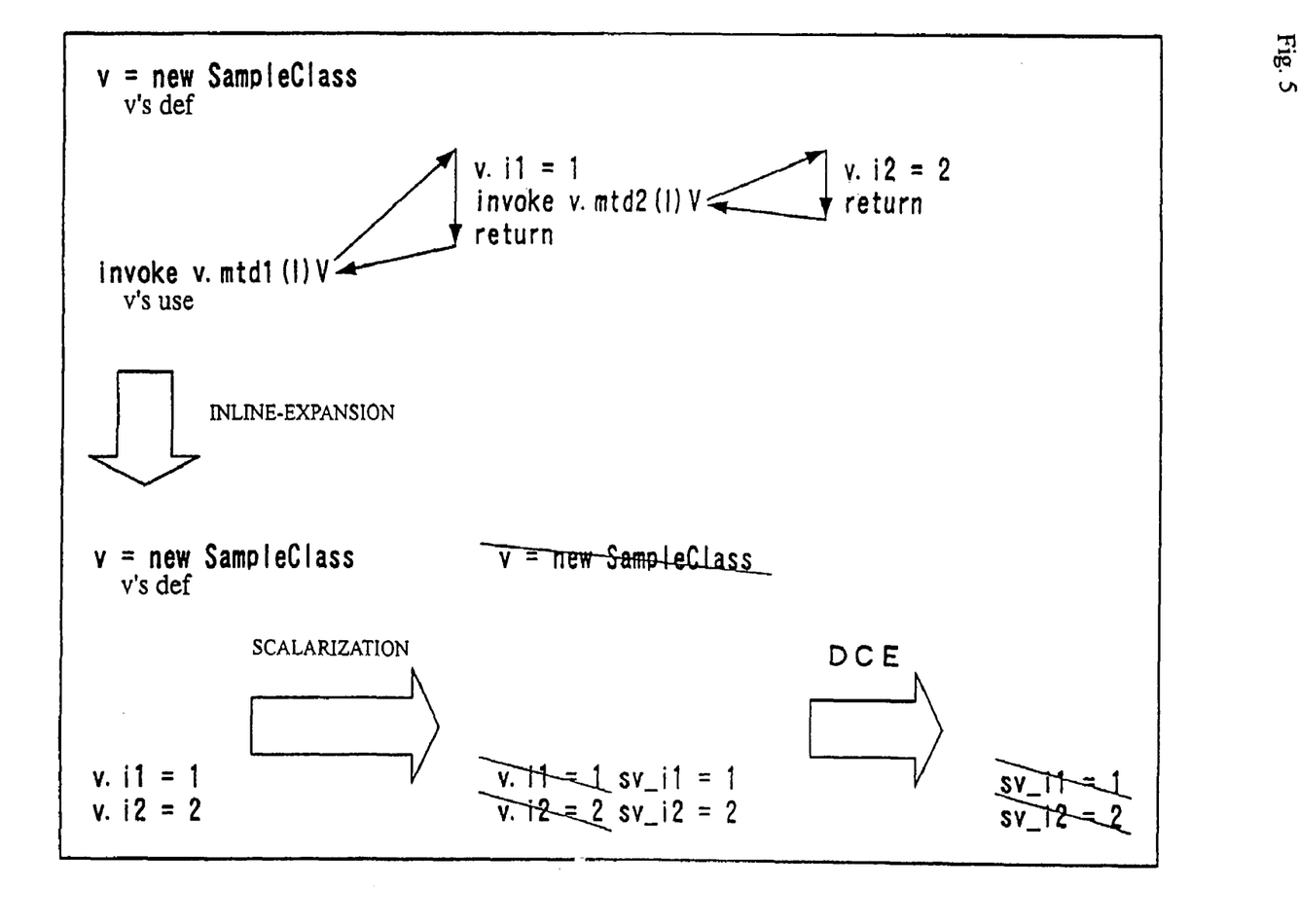
FIG. 5 is a diagram showing an optimization according to the embodiment performed for instance generation of class SampleClass by "new"

FIG. 5 is a diagram showing an optimization according to the embodiment performed for an instance generation of class SampleClass by the "new". An example shown in FIG. 5 represents the case that an object reference v is defined by an instance generation of class SampleClass, of which a use is an invocation of a method mtd1 for making an object v as a receiver. Here, a method mtd1 invokes a method mtd2 by substituting a value of 1 for an instance variable i1 of an object v, and the method mtd2 substitutes a value of 2 for an instance variable i2 of an object v. A conventional simple DCE eliminates nothing here, because an object v is used for invoking a method mtd1.

According to the embodiment, it is apparent that only a code of "invoke v.mtd1(I)V" is the use of an object in a processing target extraction unit 110 through a dataflow analysis. It is also apparent that a method mtd1 does not globalize an object v through an escape analysis. Accordingly, a use of an object v is found to be a phantom use only. Then, a processing target extraction unit 110 makes such invocation of method an optimization target. Then, methods mtd1 and mtd2 are inline-expanded by an inline-expansion unit 130 and scalarized by a scalarization unit 140, as shown in FIG. 5. Substitution for each scalar edition is eliminated by a DCE execution unit 150, because it is dead store. In the above-described manner, useless codes can be eliminated.

Figure 6:
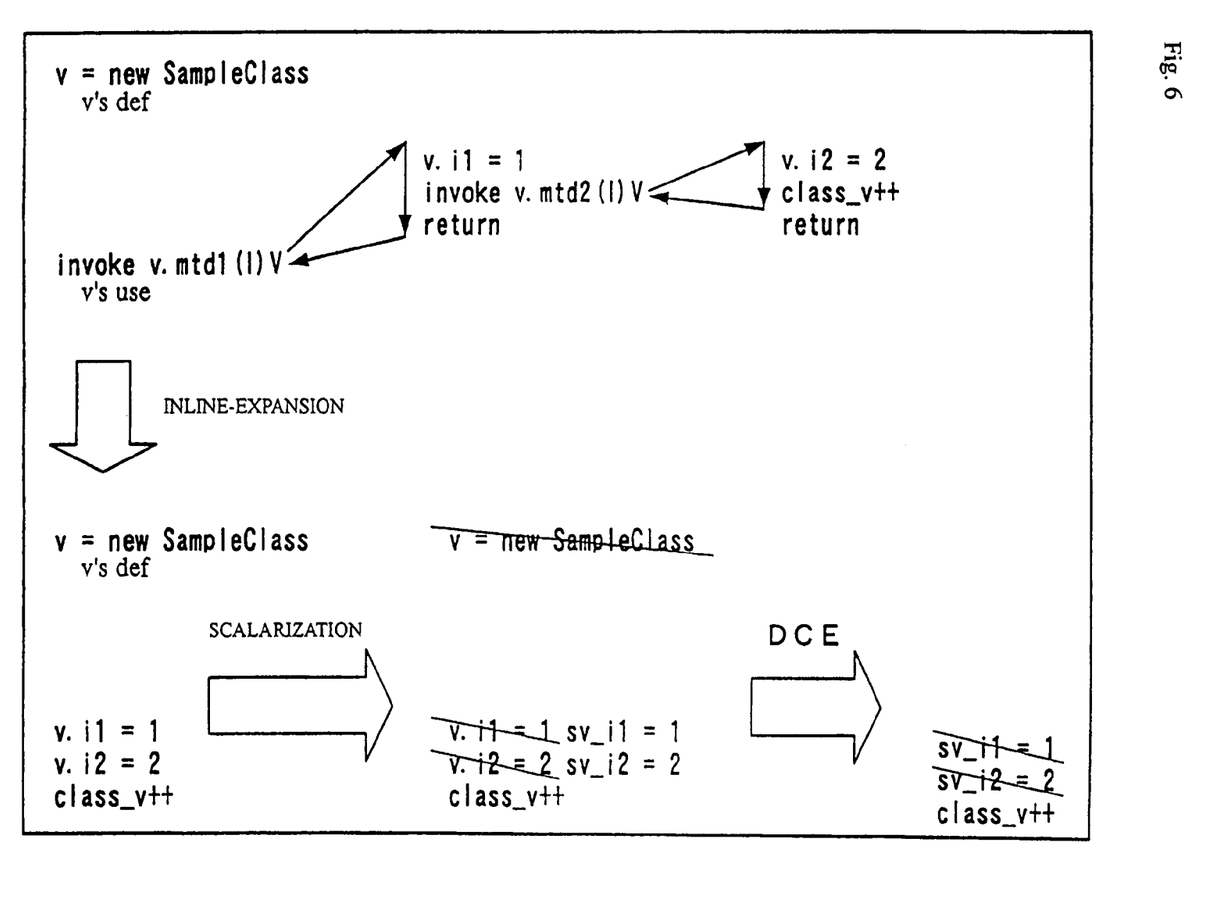
FIG. 6 is a diagram showing an optimization according to the embodiment performed for instance generation of class SampleClass by "new", which is an example of a method mtd2 having side effects.

FIG. 6 is a diagram showing an optimization according to the embodiment performed for instance generation of class SampleClass by "new" as shown in FIG. 5, differing in that a method mtd2 has side effects.

A conventional simple DCE also eliminates nothing here, because an object v is used for invoking a method mtd1. According to the embodiment, class_v is counted up by one while a value of 2 is substituted for an instance variable i2 of an object v in a method mtd2.

At a processing target extraction unit 110, only an "invoke v.mtd1(I)V" code is found to be a use of an object by a dataflow analysis, and a method mtd1 is found not to globalize an object v by an escape analysis, and finally, a use of an object v is found to be a phantom use only. Accordingly, methods mtd1 and mtd2 are made to be an optimization target by a processing target extraction unit 110, inline-expanded by an inline-expansion unit 130, and scalarized by a scalarization unit 140. Then, a substituted part for a scalar edition, which is a dead store, is eliminated by a DCE execution unit 150.

On the other hand, a code that counts up class_v by one is not a variable of an object that is generated by "new". The effect of the code can be observed from outside. Accordingly, the code neither becomes dead store, nor a target of elimination.

In other words, according to the embodiment, if calculation of a global value such as substitution for a static variable or other objects, or calculation with a reaching use, i.e., calculation, which is not a dead store, exists in an inline-expanded code, that calculation remains intact, eliminating only the useless calculation for a useless result.

[Advantages of the Invention]

As described above, the present invention may focus on a definition of an object reference, which does not have a reaching use when a method invocation is ignored, and can provide an optimization method for eliminating such calculation as it operates the object reference.

I claim:

1. A computer method comprising converting a program which reads in a source code of an execution program written in a high level object-oriented programming language and converts it into a machine language code, the step of converting comprising steps of:
    performing a plurality of multilevel method invocations to generate a piece of information, wherein said source code has each function from a plurality of functions formed into a separate component and comprising at least one object generated on a heap and comprising a value written on the heap which can be globally referenced,
    reading out an execution program to be processed from a memory and examining whether a use of an object reference during a method invocation is an argument in which an element of an object is not used for a particular method invocation in the execution program, said particular method invocation being at least one invocation from the plurality of multilevel method invocations performed to generate the piece of information;
    eliminating a predetermined code in the particular method invocation with dead code elimination, if the particular method invocation does not globalize the object reference during the particular method invocation and if a use of each object reference during the particular method invocation is an argument in which an element of the object is not used, for a predetermined method invocation in said execution program;
    inline-expanding the particular method invocation prior to said step of eliminating a code of the particular method invocation with dead code elimination, and when a callee routine is inlined to the caller, callee code is optimized as a part of the caller code; and
    storing an execution program, of which a code has been eliminated, into a memory.

2. The computer method according to claim 1, further comprising a step of scalarizing an instance variable of a particular object in the particular method invocation prior to said step of eliminating a code of the particular method invocation with dead code elimination.

3. The computer method according to claim 1, further comprising:
    a step of inline-expanding the particular method invocation prior to said step of eliminating a code of the particular method invocation with dead code elimination, and
    a step of scalarizing an instance variable of a particular object in the particular method invocation prior to said step of eliminating a code of the particular method invocation with dead code elimination.

4. A method comprising
    converting a program which reads in a source code of an execution program written in a high level object-oriented programming language and converts it into a machine language code, performs a plurality of multi-level method invocations to generate a piece of information, wherein said source code has each function from a plurality of functions formed into a separate component and comprising at least one object generated on a heap and comprising a value written on the heap which can be globally referenced,
    said step of converting comprising:
    a first step of reading out an execution program to be processed from a memory and inline-expanding a predetermined method invocation in the execution program wherein said predetermined method invocation being an invocation from a plurality of multilevel method invocations performed to generate a piece of information and determining the method invocation as a target of the inline-expansion, if the predetermined method invocation in an execution program does not globalize the object reference during the method invocation, and
    when a callee routine is inlined to the caller, callee code is optimized as a part of the caller code;
    a second step of scalarizing an instance variable of an object in said inline-expanded method invocation;
    a third step of executing dead code elimination for said execution program, which has been subject to the first and the second steps; and
    a fourth step of storing the execution program, which has been subject to dead code elimination, into a memory.

5. The method for converting a program according to claim 4, further comprising a step of determining the method invocation as a target of the inline-expansion, if a use of each object reference during the method invocation is an argument, in which an element of the object is not used, for the method invocation in the execution program.

6. A computer which reads in a source code of an execution program written in a high level object-oriented programming language and converts it into a machine language code, comprising:

a processing target extraction unit which determines a method invocation to be a processing target based on a state of a use of an object reference in the method invocation, said method invocation being at least one invocation from a plurality of multilevel method invocations performed to generate a piece of information, and performs a plurality of method invocations to generate a piece of information, wherein said source code has each function from a plurality of functions formed into a separate component and comprising at least one object generated on a heap and having a value written on the heap which can be globally referenced;

an inline-expansion unit that inline-expands the method invocation, which has been determined as a processing target at said processing target extraction unit;

a scalarization unit which scalarizes an instance variable of an object in said inline-expanded method invocation at said inline-expansion unit; and if the method invocation does not globalize an object reference during the method invocation and if a use of each object reference during the method invocation is an argument, in which an element of the object is not used, for a predetermined method invocation in said execution program, and when a callee routine is inlined to the caller, callee code is optimized as a part of the caller code; and a dead code elimination unit that performs dead code elimination for an execution program, which has been subject to processes at said inline-expansion unit and said scalarization unit.

7. The computer according to claim 6, further comprising a code analysis unit capable of analyzing a reaching use for a global value, said code analysis unit examines whether a use of an object reference during the method invocation is an argument, in which an element of the object is not used, for said method invocation in the execution program, wherein said processing target extraction unit determines the method invocation to be a processing target based on the result at said code analysis unit.

8. A computer comprising:

a compiler that compiles a source code of a program, which is written in a high level object-oriented programming language, and converts it into a machine language code and performs a plurality of multilevel method invocations to generate a piece of information, wherein said source code has each function from a plurality of functions formed into a separate component and comprising at least one object generated on a heap and comprising a value written on the heap which can be globally referenced; and a program execution unit that executes the program, which has been converted into a machine language code, wherein said compiler comprises:

a processing target extraction unit that makes a method invocation as a processing target if the method invocation does not globalize an object reference during the method invocation and if a use of each object reference during the method invocation is an argument, in which an element of an object generated on a heap is not used, for a predetermined method invocation in said program wherein said predetermined method invocation being at least one invocation from a plurality of multilevel method invocations performed to generate a piece of information;

an inline-expansion unit that inline-expands the method invocation prior to a step of dead code eliminating a code of the method invocation with dead code elimination, and when a callee routine is inlined to the caller, callee code is optimized as a part of the caller code, which has been determined as a processing target at said processing target extraction unit;

a scalarization unit that scalarizes an instance variable of an object in said method invocation, which has been inline-expanded at said inline-expansion unit; and a dead code elimination unit that performs said dead code elimination for an execution program, which has been subject to processes at said inline-expansion unit and said scalarization unit.

9. A programming device comprising a program that controls a computer and converts a source code of an execution program written in a high level object-oriented programming language into a machine language code, characterized in that said program causes said computer:

to perform a plurality of multilevel method invocations to generate a piece of information, wherein said source code has each function from a plurality of functions formed into a separate component and comprising at least one object generated on a heap and comprising a value written on the heap which can be globally referenced, to read out an execution program to be processed from a memory and to examine whether a use of an object reference during a method invocation is an argument in which an element of the object is not used, for a method invocation in the execution program wherein the method invocation is an invocation from a plurality of multilevel method invocations performed to generate a piece of information;

to eliminate a predetermined code in the method invocation with dead code elimination, if the method invocation does not globalize an object reference during the method invocation and if a use of each object reference during the method invocation is an argument in which an element of the object is not used, for a predetermined method invocation in the execution program;

inline-expand the method invocation prior to eliminating a code of the method invocation with said dead code elimination, and when a callee routine is inlined to the caller, callee code is optimized as a part of the caller code; and to store an execution program, of which said code has been eliminated.

10. The program according to claim 9, characterized by the program further causes said computer to scalarize an instance variable of an object in the method invocation prior to eliminating a code of the method invocation with said dead code elimination.

11. A computer readable program storage medium comprising a program that controls a computer and converts a source code of an execution program written in a high level object-oriented programming language into a machine language code, characterized in that said program causes said computer to function as:

means for performing a plurality of multilevel method invocations to generate a piece of information, wherein said source code has each function from a plurality of functions formed into a separate component and comprising at least one object generated on a heap and comprising a value written on the heap which can be globally referenced, and reading out an execution program to be processed from a memory and for determining a method invocation to be a processing target based on a state of a use of an object reference in the method invocation in the execution program, said method invocation being an invocation from a plurality of multilevel method invocations performed to generate a piece of information;

means for reading out said execution program to be processed from a memory and for inline-expanding said method invocation, which has been determined as a processing target;

means for inline-expand method invocation prior to eliminating a code of the method invocation with said dead code elimination, and when a callee routine is inlined to the caller, callee code is optimized as a part of the caller code;

means for scalarizing an instance variable of an object in said inline-expanded method invocation; and means for performing dead code elimination for said execution program, which has been subject to said inline-expansion and to said scalarization.

12. The computer readable program storage medium according to claim 11, characterized in that said program further causes said computer to function as means for examining whether a use of an object reference during the method invocation is an argument in which an element of the object is not used, for said method invocation in said execution program, wherein said means for determining the method invocation to be a processing target determines the method invocation to be a processing target based on an examination result for said method invocation.

13. A storage medium, on which a computer readably stores a program that controls the computer and converts a source code of an execution program written in a high level object-oriented programming language into a machine language code, characterized in that said program causes said computer:

to perform a plurality of multilevel method invocations to generate a piece of information, wherein said source code has each function from a plurality of functions formed into a separate component and comprising at least one object generated on a heap and comprising a value written on the heap which can be globally referenced, to read out an execution program to be processed from a memory and to examine whether a use of an object reference during a method invocation is an argument in which an element of the object is not used, for the method invocation in the execution program, said method invocation being an invocation from a plurality of multilevel method invocations performed to generate a piece of information;

to eliminate a predetermined code in the method invocation with dead code elimination, if the method invocation does not globalize the object reference during the method invocation and if a use of each object reference during the method invocation is an argument in which an element of the object is not used, for a predetermined method invocation in said execution program, wherein said deal code elimination further includes a inline-expand method invocation prior to eliminating a code of the method invocation with said dead code elimination, and when a callee routine is inlined to the caller, callee code is optimized as a part of the caller code; and to store an execution program, of which a code has been eliminated, into a memory.

14. A storage medium, on which a computer readably stores a program that controls the computer and converts a source code of an execution program written in an a high level object-oriented programming language into a machine language code, characterized in that said program causes said computer to function as:

to perform a plurality of multilevel method invocations to generate a piece of information, wherein said source code has each function from a plurality of functions formed into a separate component and comprising at least one object generated on a heap and comprising a value written on the heap which can be globally referenced, means for reading out an execution program to be processed from a memory and for determining the method invocation to be a processing target based on a state of a use of an object reference in the method invocation in the execution program, said method invocation being an invocation from a plurality of multilevel method invocations performed to generate a piece of information;

means for reading out said execution program to be processed from a memory and for inline-expanding said method invocation, which has been determined as a processing target;

means for inline-expand method invocation prior to eliminating a code of the method invocation with said dead code elimination, and when a callee routine is in lined to the caller, callee code is optimized as a part of the caller code;

means for scalarizing an instance variable of an object in said inline-expanded method invocation; and means for executing dead code elimination for said execution program, which has been subject to said inline-expansion and to said scalarization.

15. An apparatus for converting a program which reads in a source code of an execution program written in a high level object-oriented programming language and converts it into a machine language code, comprising:

means for performing a plurality of multilevel method invocations to generate a piece of information, wherein said source code has each function from a plurality of functions formed into a separate component and comprising at least one object generated on a heap and comprising a value written on the heap which can be globally referenced, and for reading out an execution program to be processed from a memory and examining whether a use of an object reference during a method invocation is an argument in which an element of the object is not used for a particular method invocation in the execution program, said particular method invocation being at least one invocation from a plurality of multilevel method invocations performed to generate a piece of information;

means for eliminating a predetermined code in the particular method invocation with dead code elimination, if the particular method invocation does not globalize an object reference during the particular method invocation and if a use of each object reference during the particular method invocation is an argument in which an element of the object is not used, for a predetermined method invocation in said execution program;

means for inline-expand method invocation prior to eliminating a code of the method invocation with said dead code elimination, and when a callee routine is inlined to the caller, callee code is optimized as a part of the caller code; and means for storing into a memory an execution program, of which a code has been eliminated by said means for eliminating.

* * * * *